United States Patent [19]
Komiya et al.

[11] Patent Number: 5,747,609
[45] Date of Patent: May 5, 1998

[54] METHOD FOR PRODUCING AN AROMATIC POLYCARBONATE HAVING IMPROVED MELT STABILITY

[75] Inventors: Kyosuke Komiya; Shinsuke Fukuoka, both of Kurashiki, Japan

[73] Assignee: Asahi Kasei Kogyo Kabushiki Kaisha, Osaka, Japan

[21] Appl. No.: 785,505

[22] Filed: Jan. 17, 1997

[30] Foreign Application Priority Data

Jan. 17, 1996 [JP] Japan .................................. 8-005691

[51] Int. Cl.⁶ ........................................................ C08F 2/00
[52] U.S. Cl. ........................... 526/68; 528/196; 528/198; 526/67
[58] Field of Search ........................ 526/67, 68; 528/196, 528/198

[56] References Cited

U.S. PATENT DOCUMENTS 5,189,139  2/1993  Tuinstra et al. ............................ 528/196

FOREIGN PATENT DOCUMENTS

| 42-9820 | 5/1967 | Japan . |
| 6116210A | 4/1994 | Japan . |
| 6157410A | 6/1994 | Japan . |

*Primary Examiner*—Terressa Mosley
*Attorney, Agent, or Firm*—Birch, Stewart, Kolasch & Birch, LLP

[57] ABSTRACT

Disclosed is a method for producing an aromatic polycarbonate, which comprises: reacting a feedstock dialkyl carbonate with a feedstock phenol in the presence of a catalyst to produce diphenyl carbonate, wherein a phenol mixture comprising component phenols which are different in supply source is used as the feedstock phenol, and polymerizing the produced diphenyl carbonate with an aromatic dihydroxy compound to produce an aromatic polycarbonate while producing phenol as a by-product, wherein the by-product phenol obtained in the production of the aromatic polycarbonate is used as a component phenol of the feedstock phenol mixture for producing diphenyl carbonate, and wherein the content of the by-product phenol in the feedstock phenol mixture is controlled to a level in the range of from 70 to 99% by weight. According to the method of the present invention, an aromatic polycarbonate having excellent melt stability at high temperatures can be stably produced. In the method of the present invention, a by-product phenol obtained in the production of an aromatic polycarbonate is effectively utilized for obtaining diphenyl carbonate used for producing an aromatic polycarbonate.

12 Claims, 2 Drawing Sheets

METHOD FOR PRODUCING AN AROMATIC POLYCARBONATE HAVING IMPROVED MELT STABILITY

BACKGROUND OF THE INVENTION

1. Field of the Invention

The present invention relates to a method for producing an aromatic polycarbonate. More particularly, the present invention is concerned with a method for stably producing an aromatic polycarbonate having improved melt stability at high temperatures. The method of the present invention comprises: reacting a feedstock dialkyl carbonate with a feedstock phenol in the presence of a catalyst to produce diphenyl carbonate, wherein a phenol mixture is used as the feedstock phenol, and polymerizing the produced diphenyl carbonate with an aromatic dihydroxy compound to produce an aromatic polycarbonate while producing phenol as a by-product, wherein the by-product phenol obtained in the production of the aromatic polycarbonate is used as component phenol of the feedstock phenol mixture for producing diphenyl carbonate, and wherein the content of the by-product phenol in the feedstock phenol mixture is controlled to a level in the range of from 70 to 99% by weight. In the method of the present invention, a by-product phenol obtained in the production of an aromatic polycarbonate is effectively utilized for obtaining diphenyl carbonate used for producing an aromatic polycarbonate. Therefore, the method of the present invention is extremely advantageous especially for the production of an aromatic polycarbonate having improved melt stability on a large commercial scale.

2. Prior Art

In recent years, aromatic polycarbonates have been widely used in various fields as engineering plastics having excellent heat resistance, impact resistance and transparency. With respect to methods for producing aromatic polycarbonates, various studies have heretofore been made. Of the methods studied, a process utilizing an interfacial polycondensation between an aromatic dihydroxy compound, such as 2,2-bis(4-hydroxyphenyl)propane (hereinafter, frequently referred to as "bisphenol A"), and phosgene has been commercially practiced.

However, the interfacial polycondensation process has problems in that it is necessary to use phosgene, which is poisonous, that a reaction apparatus is likely to be corroded with chlorine-containing compounds, such as hydrogen chloride and sodium chloride, which are by-produced, and methylene chloride which is used as a solvent in a large quantity, and that difficulties are encountered in separating and removing impurities, such as sodium chloride, and residual methylene chloride, which adversely affect properties of a produced polymer.

For solving the above-mentioned problems, various methods for producing an aromatic polycarbonate by using diaryl carbonate or dialkyl carbonate instead of phosgene have been proposed.

For producing an aromatic polycarbonate using dialkyl carbonate, for example, a method in which a transesterification reaction is effected between a dialkyl carbonate and an aromatic dihydroxy compounds (Unexamined Japanese Patent Application Laid-Open Specification Nos. 57-2334, 60-169444 and 60-169445) and a method in which a trans-esterification reaction is effected between a dialkyl carbonate and a fatty acid ester of an aromatic dihydroxy compounds (Unexamined Japanese Patent Application Laid-Open Specification No. 59-210938) have been proposed. In the case of the above-mentioned methods using a dialkyl carbonate, during the reaction, an aliphatic monohydroxy compound and derivatives thereof, a dialkyl carbonate and the like are distilled as a low boiling point fraction from the system for the polymerization. Usually, the distillate is in a liquid state at ambient temperature, so that the distillate can be easily handled as compared to the distillate obtained during the reaction in the case of a method using a diaryl carbonate. However, the method in which a transesterification reaction is effected between a dialkyl carbonate and an aromatic hydroxy compounds has a problem in that the reaction rate is so low that it is difficult to obtain a high molecular weight polycarbonate. The method in which a transesterification reaction is effected between a fatty acid ester of an aromatic hydroxy compound and a dialkyl carbonate is not commercially satisfactory because unstable and poisonous substances, such as ketene are formed during the production of the starting material. In addition, in a method using a dialkyl carbonate, the alkyl carbonate group is introduced to the terminal of the aromatic polycarbonate produced. Therefore, a problem arises such that the obtained polycarbonate has poor thermal stability due to the alkyl carbonate groups bonded to the terminals of the polycarbonate.

On the other hand, a method for producing an aromatic polycarbonate from an aromatic dihydroxy compound and a diaryl carbonate by transesterification reaction is well known. For example, an aromatic polycarbonate can be produced by polymerizing bisphenol A with diphenyl carbonate in molten state. In this method, a high polymerization degree of the polycarbonate cannot be achieved without distilling off an aromatic monohydroxy compound (such as phenol) produced as a by-product from the highly viscous molten polycarbonate. Therefore, this method has various disadvantages in the following points: (1) a high temperature is needed for a polymerization and, therefore, branching and/or crosslinking are likely to occur as side reactions, so that it is difficult to obtain a high quality polycarbonate; (2) undesirable discoloration of the polymer cannot be avoided; and the like [see "Purasuchikku Zairyo Koza [5], Porikaboneto Jushi (Lecture of Plastic Materials [5], Polycarbonate resins)", pages 62–67, written by Mikio Matsukane et al. and published by Nikkan Kogyo Shinbunsha (1969)].

For solving the above-mentioned problems, various attempts have been made with respect to catalysts, stabilizers, polymerization methods and the like. Especially, in the specification of No. WO95/03351, the present inventors have disclosed a method for producing an aromatic polycarbonate by conducting a polymerization reaction in which a molten mixture of an aromatic dihydroxy compound and a diaryl carbonate or a prepolymer obtained by the reaction of an aromatic dihydroxy compound with a diaryl carbonate is allowed to pass downwardly through a perforated plate and fall freely, so that polymerization is effected during the free-fall. By this method, a high quality aromatic polycarbonate with no discoloration can be obtained.

The present inventors have also proposed a method for producing an aromatic polycarbonate by solid phase polymerization of a diaryl carbonate with an aromatic dihydroxy compound (e.g. U.S. Pat. Nos. 4,948,871, 5,204,377, 5,214,073), and disclosed that a high quality aromatic polycarbonate can be obtained by the method.

A method for producing an aromatic polycarbonate, which comprises reacting a dialkyl carbonate with an aromatic monohydroxy compound to obtain a diaryl carbonate, and polymerizing the obtained diaryl carbonate with an aromatic dihydroxy compound, is already disclosed, for example, in Example 1 of Unexamined Japanese Patent Application Laid-Open Specification No. 4-100824.

With respect to the method for producing a diaryl carbonate from a dialkyl carbonate and an aromatic monohydroxy compound, there have been proposed various methods, such as (1) a method in which a diaryl carbonate is produced by transesterification of a dialkyl carbonate with an aromatic monohydroxy compound, and (2) a method in which an alkyl aryl carbonate is obtained by reacting a dialkyl carbonate with an aromatic monohydroxy compound, and the obtained alkyl aryl carbonate is subjected to disproportionation to obtain a diaryl carbonate. In connection with these methods, various proposals have been made with respect to catalysts (see, for example, Unexamined Japanese Patent Application Laid-Open Specification No. 51-105032, U.S. Pat. No. 4,182,726, Unexamined West German Patent Application Laid-Open Specification No. 2736062, U.S. Pat. No. 4,552,704, Unexamined Japanese Patent Application Laid-Open Specification No. 57-176932, Unexamined Japanese Patent Application Laid-Open Specification No. 57-183745, U.S. Pat. No. 4,410,464, Unexamined Japanese Patent Application Laid-Open Specification No. 61-172852), production modes and the like. As preferred production modes for obtaining an aromatic carbonate, the present inventors previously developed a method in which a dialkyl carbonate and an aromatic hydroxy compound are continuously fed to a continuous multi-stage distillation column to effect a continuous transesterification reaction in the distillation column, while continuously withdrawing a low boiling point reaction mixture containing a by-produced alcohol from an upper portion of the distillation column by distillation and continuously withdrawing a high boiling point reaction mixture containing a produced alkyl aryl carbonate from a lower portion of the distillation column, and a method in which a single type alkyl aryl carbonate is or two different types of alkyl aryl carbonates are continuously fed to a continuous multi-stage distillation column to effect a continuous reaction thereof in the distillation column, while continuously withdrawing a produced diaryl carbonate from a lower portion of the distillation column (Unexamined Japanese Patent Application Laid-Open Specification No. 3-291257, Unexamined Japanese Patent Application Laid-Open Specification No. 4-211038, Unexamined Japanese Patent Application Laid-Open Specification No. 4-230242, and Unexamined Japanese Patent Application Laid-Open Specification No. 4-235951). By these methods, efficient, continuous production of an aromatic carbonate has for the first time been realized. Thereafter, various methods for continuously producing an aromatic carbonate have further been developed, based on the above-mentioned methods developed by the present inventors. Examples of these methods include a method in which a catalytic transesterification reaction is performed in a column reactor (see Unexamined Japanese Patent Application Laid-Open Specification No. 6-41022, Unexamined Japanese Patent Application Laid-Open Specification No. 6-157424, Unexamined Japanese Patent Application Laid-Open Specification No. 6-184058), a method in which use is made of a plurality of reactors which are connected in series (Unexamined Japanese Patent Application Laid-Open Specification No. 6-234707, and Unexamined Japanese Patent Application Laid-Open Specification No. 6-263694), a method in which a bubble tower reactor is used (Unexamined Japanese Patent Application Laid-Open Specification No. 6-298700) and a method in which a vertically elongated reactor vessel is used (Unexamined Japanese Patent Application Laid-Open Specification No. 6-345697).

Also, various proposals have been made for continuously, stably producing an aromatic carbonate for a prolonged period of time on a commercial scale, wherein the above-mentioned methods are used. For example, Unexamined Japanese Patent Application Laid-Open Specification No. 6-157410 discloses a method for producing aromatic carbonates from a feedstock dialkyl carbonate and a feedstock aromatic hydroxy compound, which comprises continuously supplying a mixture of the feedstocks and a catalyst to a reactor provided with a distillation column thereon to effect a transesterification reaction in the reactor, while continuously withdrawing a by-produced aliphatic alcohol from the reactor through the distillation column by distillation so as to keep the aliphatic alcohol concentration of the reaction system at 2% by weight or less. This prior art document describes that, by this method, a continuous production of an aromatic carbonate can be stably performed.

Meanwhile, in recent years, a tendency has been increased, an aromatic polycarbonate is molded under high temperature conditions in order to impart as much flowability as possible to the aromatic polycarbonate so that high precision molding can be performed. Therefore, it has been desired to produce an aromatic polycarbonate having improved melt stability at high temperatures economically on a large commercial scale. As mentioned above, with respect to the method in which a diaryl carbonate is obtained by reacting a dialkyl carbonate with an aromatic monohydroxy compound, and the obtained diaryl carbonate is polymerized with an aromatic dihydroxy compound to produce an aromatic polycarbonate, various proposals have been made for improving the properties of the produced polycarbonate and for rendering it possible to perform the polymerization operation stably. However, no reports have been made with respect to the technique of producing an aromatic polycarbonate, wherein the quality of a feedstock aromatic monohydroxy compound is appropriately controlled so as to obtain an aromatic polycarbonate having excellent melt stability at high temperatures and to render it possible to produce such an excellent aromatic polycarbonate without suffering disadvantageous phenomena, such as clogging of the conduits of the polymerizer apparatus.

SUMMARY OF THE INVENTION

In these situations, for solving the above-mentioned problems accompanying the prior art in connection with a method for producing an aromatic polycarbonate, which comprises reacting a dialkyl carbonate with phenol in the presence of a catalyst to produce diphenyl carbonate and polymerizing the produced diphenyl carbonate with an aromatic dihydroxy compound while producing phenol as by-product, the present inventors have made extensive and intensive studies as to how the quality of a feedstock phenol used in a method for producing an aromatic polycarbonate influences the quality of the produced aromatic polycarbonate and influences the stability of an operation for the production of the aromatic polycarbonate. As a result, it has unexpectedly been found that, when a mixture of phenols which are different in supply source is used for producing a diphenyl carbonate, wherein a by-product phenol obtained in the above-mentioned production of the aromatic polycarbonate is used as component phenol of the above-mentioned phenol mixture, and wherein the content of the by-product phenol in the phenol mixture is controlled to a level in the range of from 70 to 99% by weight, an aromatic polycarbonate having improved melt stability at high temperatures can be efficiently produced. The present inventors have also found that, in the above-mentioned method, when the content of an aromatic dihydroxy compound in the above-mentioned phenol mixture is rendered low, it becomes possible to stably produce a desired aromatic polycarbonate without suffering disadvantageous phenomena, such as clogging of conduits of the apparatus used for the production of the aromatic polycarbonate. Further, the present inventors have also made extensive and intensive studies as to the reason why an aromatic polycarbonate having improved melt stability at high temperatures can be efficiently produced by the above-mentioned method and, as a result, have found that such an advantageous effect is attributed to the fact that the by-product phenol obtained during the production of an aromatic polycarbonate has a low content of cresol (isomers) and/or xylenol (isomers), as compared to a commercially available phenol [hereinafter, cresol (isomers) and xylenol (isomers) are referred to simply as "cresol" and "xylenol", respectively]. The present invention has been made, based on the above findings.

Accordingly, it is a primary object of the present invention to provide a novel method for stably producing an aromatic polycarbonate having improved melt stability at high temperatures on a commercial scale, which comprises reacting a dialkyl carbonate with phenol to obtain diphenyl carbonate, and polymerizing the obtained diphenyl carbonate with an aromatic dihydroxy compound.

The foregoing and other objects, features and advantages of the present invention will be apparent from the following detailed-description and appended claims taken in connection with the accompanying drawings.

DESCRIPTION OF REFERENCE NUMERALS

1: first continuous multi-stage distillation column
2, 3, 4, 6, 7, 8, 9, 11, 12, 16, 19, 21, 23, 24, 25, 28, 29, 31, 32, 34, 35, 37, 38, 39, 40, 41, 43, 44, 46, 47, 48, 50, 51, 52, 56, 58, 59, 60, 62, 63, 64, 65, 67, 69, 69', 70, 70', 72, 74, 76, 78, 80, 81, 82, 85, 86, 87, 88, 89, 93, 94, 95, 96, 100, 101, 103, 105, 106, 108, 109, 111, 112, 113, 114: conduit
  5: preheater
  30, 36, 45, 66, 110: reboiler
  10: evaporator
  13, 22, 49, 57, 61, 77, 104: condenser
  17, 26, 54: column top
  18, 27, 55, 109: column bottom
  20: second continuous multi-stage distillation column
  33: first evaporator
  42: second evaporator
  53: purification column for diphenyl carbonate
  68: accumulation tank for purified diphenyl carbonate
  71, 71': first stage agitation type polymerizer vessel
  73: second stage agitation type polymerizer vessel
  75: distillation column
  79: gas-liquid separator
  83: roots blower
  84: liquid seal-type vacuum pump
  90, 97: perforated plate
  91: free-fall polymerizer
  92: molten prepolymer in the form of a filament
  98: wire-wetting fall polymerizer
  99: wire-type guide
  102: phenol recovering column
  107: accumulation tank for phenol
  115: crystallization vessel
  116: dryer
  117: solid-state polymerization reactor

DETAILED DESCRIPTION OF THE INVENTION

In the present invention, there is provided a method for producing an aromatic polycarbonate, which comprises:

feeding a feedstock dialkyl carbonate and a feedstock phenol mixture of phenol (a) and phenol (b) which is different in supply source from the phenol (a) to a reactor to effect a reaction between the feedstock dialkyl carbonate and the feedstock phenol mixture in the presence of a catalyst, thereby producing diphenyl carbonate, and polymerizing the diphenyl carbonate with an aromatic dihydroxy compound in a polymerizer to produce an aromatic polycarbonate while producing phenol as a by-product, wherein the by-product phenol is used as the phenol (b), and wherein the content of the phenol (b) in the feedstock phenol mixture is from 70 to 99% by weight.

For an easy understanding of the present invention, the essential features and various preferred embodiments of the present invention are enumerated below.

1. A method for producing an aromatic polycarbonate, which comprises:

feeding a feedstock dialkyl carbonate and a feedstock phenol mixture of phenol (a) and phenol (b) which is different in supply source from the phenol (a) to a reactor to effect a reaction between the feedstock dialkyl carbonate and the feedstock phenol mixture in the presence of a catalyst, thereby producing diphenyl carbonate, and polymerizing the diphenyl carbonate with an aromatic dihydroxy compound in a polymerizer to produce an aromatic polycarbonate while producing phenol as a by-product, wherein the by-product phenol is used as the phenol (b), and wherein the content of the phenol (b) in the feedstock phenol mixture is from 70 to 99% by weight.

2. The method according to item 1 above, wherein the by-product phenol used as the phenol (b) contains an impurity component ($\alpha$) which is at least one compound selected from the group consisting of cresol and xylenol, and wherein the content of the impurity component ($\alpha$) in the by-product phenol is 50 ppm by weight or less.

3. The method according to item 1 or 2 above, wherein the feedstock phenol mixture contains an impurity component ($\alpha$) which is at least one compound selected from the group consisting of cresol and xylenol, and wherein the content of the impurity component ($\alpha$) in the feedstock phenol mixture is 130 ppm by weight or less.

4. The method according to item 1 or 2 above, wherein the by-product phenol used as the phenol (b) contains an impurity component ($\beta$) which is an aromatic dihydroxy compound, and wherein the content of the impurity component ($\beta$) in the by-product phenol is 50 ppm by weight or less.

5. The method according to item 3 above, wherein the by-product phenol used as the phenol (b) contains an impurity component ($\beta$) which is an aromatic dihydroxy compound, and wherein the content of the impurity component ($\beta$) in the by-product phenol is 50 ppm by weight or less.

6. The method according to item 1 or 2 above, wherein the feedstock phenol mixture contains an impurity component (β) which is an aromatic dihydroxy compound, and wherein the content of the impurity component (β) in the feedstock phenol mixture is 90 ppm by weight or less.

7. The method according to item 3 above, wherein the feedstock phenol mixture contains an impurity component (β) which is an aromatic dihydroxy compound, and wherein the content of the impurity component (β) in the feedstock phenol mixture is 90 ppm by weight or less.

8. The method according to item 4 above, wherein the feedstock phenol mixture contains, as impurity component (β), an aromatic dihydroxy compound, and wherein the content of the impurity component (β) in the feedstock phenol mixture is 90 ppm by weight or less.

9. The method according to item 1 or 2 above, wherein the reactor is a multi-stage distillation column.

10. The method according to item 3 above, wherein the reactor is a multi-stage distillation column.

11. The method according to item 4 above, wherein the reactor is a multi-stage distillation column.

12. The method according to item 6 above, wherein the reactor is a multi-stage distillation column.

The present invention is described below in detail.

As mentioned above, in the method of the present invention, which comprises reacting a feedstock dialkyl carbonate with a feedstock phenol mixture to produce diphenyl carbonate, and polymerizing the produced diphenyl carbonate with an aromatic dihydroxy compound to produce an aromatic polycarbonate while producing phenol as a by-product, use is made of a feedstock phenol mixture containing the by-product phenol (produced during the polymerization) and having a by-product phenol content of from 70 to 99% by weight. By the method of the present invention, it becomes possible to stably produce an aromatic polycarbonate having excellent melt stability. With respect to the by-product phenol content of the feedstock phenol mixture, it is preferred that the by-product phenol content be controlled to a level in the range of from 90 to 98.5% by weight.

The reason for the above-mentioned excellent effect achieved by the use of the by-product phenol in the feedstock phenol mixture is considered to reside in that the by-product phenol produced during the polymerization for producing an aromatic polycarbonate has a low content of cresol and/or xylenol, each of which adversely affects the melt stability of the aromatic polycarbonate at high temperatures, as compared to a commercially available phenol. When a commercially available phenol having high content of cresol and/or xylenol is used as a feedstock phenol for the production of a diphenyl carbonate, the ultimate aromatic polycarbonate is caused to have a large amount of terminal methylphenyl groups and/or terminal dimethylphenyl groups. It is considered that a large amount of such methyl group-containing terminal groups contained in the aromatic polycarbonate adversely affect the melt stability of the aromatic polycarbonate at high temperatures. In the present invention, it is preferred that the content of cresol and/or xylenol in the feedstock phenol mixture be 130 ppm by weight or less.

As mentioned above, the method of the present invention comprises the steps of: reacting a feedstock dialkyl carbonate with a feedstock phenol mixture to obtain diphenyl carbonate and polymerizing the obtained diphenyl carbonate with an aromatic dihydroxy compound to produce an aromatic polycarbonate. When the method of the present invention is practiced on a commercial scale, it is preferred that the method of the present invention comprising the above-mentioned two steps be continuously conducted, wherein the respective reaction systems in the two steps are connected to each other, and the production rates in the respective steps are well-balanced. In this instance, when the content of the by-product phenol in the feedstock phenol mixture exceeds 99% by weight, the melt stability of the ultimate aromatic polycarbonate at high temperatures is unexpectedly lowered. The reason for this has not yet been elucidated, but is considered to be ascribed to the terminal structure of the aromatic polycarbonate obtained using a feedstock phenol mixture having the by-product phenol content of more than 99% by weight, as explained below. When the method of the present invention is continuously conducted, phenol (b) (i.e., the above-mentioned by-product phenol produced in the polymerization step) is recycled to the reaction system in the process for producing diphenyl carbonate. Therefore, the amount of phenol (a) fed to the reaction system corresponds to the total of ① the amount of phenol converted to a terminal phenyl carbonate group of the aromatic polycarbonate and ② the amount of phenol consumed in side reactions or led out of the reaction systems during the purification of the product, and the like. When the content of the by-product phenol in the feedstock phenol mixture exceeds 99% by weight, the content of phenol (a) becomes less than 1% by weight. In this case, when it is assumed that the amount ② does not change irrespective of the change in the content of phenol (a) in the feedstock phenol mixture, the amount ① becomes extremely small, which means that the resultant aromatic polycarbonate has terminal aromatic carbonate groups in a relatively low content and has terminal hydroxyl groups in a relatively high content. It is considered that such a high content of terminal hydroxyl groups adversely affects the melt stability of the aromatic polycarbonate at high temperatures.

By the method of the present invention, wherein the by-product phenol obtained in the production of the aromatic polycarbonate is used as component phenol of the feedsotck phenol mixture for the production of diphenyl carbonate, and wherein the content of the by-produced phenol in the feedstock phenol mixture is controlled to a level in the range of from 70 to 99% by weight, it becomes possible to produce an aromatic polycarbonate having excellent melt stability at high temperatures. Such advantageous effect achieved by the method of the present invention is completely unexpected from the techniques of the prior art.

The dialkyl carbonate used as a starting material in the present invention is represented by the following formula (1):

wherein each of $R^1$ and $R^2$ independently represents an alkyl group having 1 to 10 carbon atoms, an alicyclic group having 3 to 10 carbon atoms or an aralkyl group having 6 to 10 carbon atoms, wherein $R^1$ and $R^2$ may be bonded to each other to form a ring.

Examples of $R^1$ and $R^2$ include an alkyl group, such as methyl, ethyl, propyl (isomers), allyl, butyl (isomers), butenyl (isomers), pentyl (isomers), hexyl (isomers), heptyl (isomers), octyl (isomers), nonyl (isomers), decyl (isomers) or cyclohexylmethyl; an alicyclic group, such as cyclopropyl, cyclobutyl, cyclopentyl, cyclohexyl or cycloheptyl; and an aralkyl group, such as benzyl, phenethyl (isomers), phenylpropyl (isomers), phenylbutyl (isomers) or methylbenzyl (isomers). The above-mentioned alkyl group, alicyclic group and aralkyl group may be substituted with a substituent, such as a lower alkyl group, a lower alkoxy group, a cyano group and a halogen atom, and may also contain an unsaturated bond.

As a dialkyl carbonate having such $R^1$ and $R^2$, there may be mentioned for example, dimethyl carbonate, diethyl carbonate, dipropyl carbonate (isomers), diallyl carbonate, dibutenyl carbonate (isomers), dibutyl carbonate (isomers), dipentyl carbonate (isomers), dihexyl carbonate (isomers), diheptyl carbonate (isomers), dioctyl carbonate (isomers), dinonyl carbonate (isomers), didecyl carbonate (isomers), dicyclopentyl carbonate, dicyclohexyl carbonate, dicycloheptyl carbonate, dibenzyl carbonate, diphenethyl carbonate (isomers), di(phenylpropyl) carbonate (isomers), di(phenylbutyl) carbonate (isomers), di(chlorobenzyl) carbonate (isomers), di(methoxybenzyl) carbonate (isomers), di(methoxymethyl) carbonate, di(methoxyethyl) carbonate (isomers), di(chloroethyl) carbonate (isomers), di(cyandethyl) carbonate (isomers), methyl ethyl carbonate, methyl propyl carbonate (isomers), methyl butyl carbonate (isomers), ethyl propyl carbonate (isomers), ethyl butyl carbonate (isomers), dibenzyl carbonate, ethylene carbonate and propylene carbonate.

Of these dialkyl carbonates, a dialkyl carbonate containing as $R^1$ and $R^2$ a lower alkyl group having 4 carbon atoms or less is preferred. Most preferred is dimethyl carbonate.

In the present invention, the term "aromatic dihydroxy compound" used herein means a compound represented by the following formula:

HO—Ar—OH wherein Ar represents a divalent aromatic group having from 5 to 200 carbon atoms.

Preferred examples of divalent aromatic groups Ar having from 5 to 200 carbon atoms include an unsubstituted or substituted phenylene group, an unsubstituted or substituted naphthylene group, an unsubstituted or substituted biphenylene group and an unsubstituted or substituted pyridylene group. Further examples of such divalent aromatic groups include divalent groups, each represented by the following formula:

—Ar$^1$—Y—Ar$^2$— wherein each of Ar$^1$ and Ar$^2$ independently represents a divalent carbocyclic or heterocyclic aromatic group having from 5 to 70 carbon atoms, and Y represents a divalent alkane group having from 1 to 30 carbon atoms.

In the divalent aromatic groups Ar$^1$ and Ar$^2$, at least one hydrogen atom may be substituted with a substituent which does not adversely affect the reaction, such as a halogen atom, an alkyl group having from 1 to 10 carbon atoms, an alkoxy group having from 1 to 10 carbon atoms, a phenyl group, a phenoxy group, a vinyl group, a cyano group, an ester group, an amide group and a nitro group.

Illustrative examples of heterocyclic aromatic groups include an aromatic group having at least one hetero atom, such as a nitrogen atom, an oxygen atom or a sulfur atom.

Examples of divalent aromatic groups Ar$^1$ and Ar$^2$ include an unsubstituted or substituted phenylene group, an unsubstituted or substituted biphenylene group and an unsubstituted or substituted pyridylene group. Substituents for Ar$^1$ and Ar$^2$ are as described above.

Examples of divalent alkane groups Y include organic groups respectively represented by the following formulae:

wherein each of $R^3$, $R^4$, $R^5$ and $R^6$ independently represents a hydrogen atom, an alkyl group having from 1 to 10 carbon atoms, an alkoxy group having from 1 to 10 carbon atoms, a cycloalkyl group having from 5 to 10 ring-forming carbon atoms, a carbocyclic aromatic group having from 5 to 10 ring-forming carbon atoms and a carbocyclic aralkyl group having from 6 to 10 ring-forming carbon atoms; k represents an integer of from 3 to 11; each X represents a carbon atom and has $R^7$ and $R^8$ bonded thereto; each $R^7$ independently represents a hydrogen atom or an alkyl group having from 1 to 6 carbon atoms, and each $R^8$ independently represents a hydrogen atom or an alkyl group having from 1 to 6 carbon atoms, wherein $R^7$ and $R^8$ are the same or different;

wherein at least one hydrogen atom of each of $R^3$, $R^4$, $R^5$, $R^6$, $R^7$ and $R^8$ may be independently replaced by a substituent which does not adversely affect the reaction, such as a halogen atom, an alkyl group having from 1 to 10 carbon atoms, an alkoxy group having from 1 to 10 carbon atoms, a phenyl group, a phenoxy group, a vinyl group, a cyano group, an ester group, an amide group and a nitro group.

Specific examples of divalent aromatic groups Ar include groups respectively represented by the following formulae:

wherein each of $R^9$ and $R^{10}$ independently represents a hydrogen atom, a halogen atom, an alkyl group having from 1 to 10 carbon atoms, an alkoxy group having from 1 to 10 carbon atoms, a cycloalkyl group having from 5 to 10 ring-forming carbon atoms, or an allyl group having from 6 to 30 carbon atoms; each of m and n independently represents an integer of from 1 to 4, with the proviso that when m is an integer of from 2 to 4, $R^9$'s are the same or different, and when n is an integer of from 2 to 4, $R^{10}$'s are the same or different.

Further, examples of divalent aromatic groups Ar also include those which are represented by the following formula:

$$—Ar^1—Z—Ar^2—$$

wherein $Ar^1$ and $Ar^2$ are as defined above; and Z represents a single bond or a divalent group, such as —O—, —CO—, —S—, —SO$_2$, —SO—, —COO—, or —CON(R$^3$)—, wherein $R^3$ is as defined above.

Examples of such divalent aromatic groups Ar include groups respectively represented by the following formulae:

wherein $R^9$, $R^{10}$, m and n are as defined above.

In the method of the present invention, the aromatic dihydroxy compounds can be used individually or in combination. Representative examples of aromatic dihydroxy compounds include bisphenol A.

As mentioned above, in the method of the present invention, a feedstock dialkyl carbonate is reacted with a feedstock phenol mixture in the presence of a catalyst to obtain diphenyl carbonate, and the obtained diphenyl carbonate is polymerized with an aromatic dihydroxy compound to produce an aromatic polycarbonate while producing phenol as by-product, wherein the content of the by-product phenol [phenol (b)] in the feedstock phenol mixture is from 70 to 99% by weight. It is preferred that the content of the by-product phenol in the feedstock phenol mixture be controlled to a level in the range of from 90 to 98.5% by weight.

The by-product phenol obtained in the production of an aromatic polycarbonate is generally contains at least one compound selected from the group consisting of cresol and xylenol in an amount of 50 ppm or less, based on the weight of the by-product phenol. The content of the at least one compound selected from cresol and xylenol in the by product phenol may be 40 ppm by weight or less, or 30 ppm by weight or less.

On the other hand, the other component phenol of the feedstock phenol mixture [i.e., phenol (a) used in mixture with a by-product phenol obtained in the production of an aromatic polycarbonate] is not specifically limited, as long as the other component phenol is a phenol other than phenol (b) which is a by-product phenol obtained in the production of an aromatic polycarbonate. Phenol (a) may be obtained from any supply source, and may be a mixture of a plurality of lots of phenol respectively obtained from a plurality of supply sources. However in general, a commercially available industrial phenol is used. The content of cresol and/or xylenol in a commercially available industrial phenol is from 70 to 500 ppm by weight. In the method of the present invention, the feedstock phenol mixture is obtained by mixing the by-product phenol with, for example, a commercially available phenol for industrial purpose. As mentioned above, an aromatic polycarbonate having high melt stability cannot be obtained when use is made of a feedstock phenol mixture containing a large amount of cresol and/or xylenol. It is preferred that the content of cresol and/or xylenol in a feedstock phenol mixture be 130 ppm by weight or less, more preferably 110 ppm by weight or less, still more preferably 90 by weight ppm or less.

Further, because of the reason described below, it is preferred that the content of an aromatic dihydroxy compound in a by-product phenol obtained in the production of an aromatic polycarbonate be 50 ppm by weight or less, more preferably 40 ppm or less, still more preferably 30 ppm or less. The aromatic dihydroxy compound mentioned here is the same as the aromatic dihydroxy compound defined above. Examples of methods for controlling the content of an aromatic dihydroxy compound in a by-product phenol obtained in the production of an aromatic polycarbonate to a level in the range of 50 ppm by weight or less include a method in which a distillation column is connected to the vent of a polymerizer used in the production of an aromatic polycarbonate, and phenol, diphenyl carbonate, an aromatic dihydroxy compound and the like distilled from the polymerizer are directly introduced to the distillation column, thereby recovering the phenol from the top of the distillation column, and a method in which a by-product phenol and the like obtained in the production of an aromatic polycarbonate are condensed using a condenser, and the resultant condensate mixture containing the phenol is recovered and subjected to distillation-separation. It is preferred that the content of an aromatic dihydroxy compound in the feedstock phenol mixture be 90 ppm by weight or less, more preferably 70 ppm by weight or less, still more preferably 50 ppm by weight or less.

When the content of an aromatic dihydroxy compound in the feedstock phenol mixture is more than 90 ppm by weight, disadvantageous phenomena, such as clogging of conduits, are likely to occur during the operation for producing diphenyl carbonate, so that it becomes difficult to stably produce diphenyl carbonate.

As mentioned above, according to the method of the present invention, an aromatic polycarbonate having improved melt stability at high temperatures can be produced by using a feedstock phenol mixture containing a large amount (70 to 99% by weight) of a by-product phenol obtained in the production of an aromatic polycarbonate. The method of the present invention, which utilizes a by-product phenol, may be practiced in a continuous process wherein the by-product phenol is continuously recycled, or in a batchwise process wherein the by-product phenol is stored in a storage tank prior to the use. In either process, the method of the present invention is much advantageously especially when an aromatic polycarbonate is commercially produced on a relatively large commercial scale. It is preferred that the production capacity of the production apparatus used in practicing the method of the present invention be 1,000 tons or more per year, more preferably 5,000 tons or more per year in terms of the weight of the aromatic polycarbonate produced.

In the method of the present invention, the reaction mode for producing diphenyl carbonate may be any of the following modes: (1) a mode in which diphenyl carbonate is obtained in one step by reacting dialkyl carbonate with phenol while withdrawing a by-produced aliphatic alcohol from the reaction system, (2) a mode in which an alkyl phenyl carbonate is first obtained by reacting a dialkyl carbonate with phenol while withdrawing a by-produced aliphatic alcohol from the reaction system, and the alkyl phenyl carbonate is then disproportionated into diphenyl carbonate and a by-produced dialkyl carbonate while withdrawing the by-produced dialkyl carbonate from the reaction system, and (3) a mode in which a mixture of an alkyl phenyl carbonate and diphenyl carbonate is obtained by reacting a dialkyl carbonate with phenol, and disproportionation of the alkyl phenyl carbonate in the mixture is conducted to obtain diphenyl carbonate. [With respect to the above-mentioned modes (1) to (3), reference can be made to U.S. Pat. No. 4,948,871.]

In the present invention, there is no particular limitation with respect to the type of the reactor to be used for producing diphenyl carbonate by reacting a dialkyl carbonate with phenol, and various types of conventional reactors, such as an agitation type reactor, a multi-stage agitation type reactor and a multi-stage distillation column, can be used. These types of reactors can be used individually or in combination, and may be used either in a batchwise process or a continuous process. From the viewpoint of efficiently biasing the equilibrium toward the product system, a multi-stage distillation column is preferred, and a continuous process using a multi-stage distillation column is especially preferred. There is no particular limitation with respect to the multi-stage distillation column to be used in the present invention as long as it is a distillation column having a theoretical number of stages of distillation of two or more and which can be used for performing continuous distillation. Examples of such multi-stage distillation columns include plate type columns using a tray, such as a bubble-cap tray, a perforated tray, a valve tray and a counterflow tray, and packed type columns packed with various packings, such as a Raschig ring, a Lessing ring, a Pall ring, a Berl saddle, an Intelox saddle, a Dixon packing, a McMahon packing, a Heli pack, a Sulzer packing and Mellapak. In the present invention, any of the columns which are generally used as a multi-stage distillation column can be utilized. Further, a mixed type of plate column and packed column comprising both a plate portion and a portion packed with packings, can also be preferably used.

In the present invention, the continuous production of an aromatic carbonate using a multi-stage distillation column can be conducted by a method in which the starting and reactant materials [i.e., a dialkyl carbonate and phenol in the case of reaction mode (1) above, and a dialkyl carbonate and phenol in the case of reaction modes (2) and (3) above] are continuously fed to the continuous multi-stage distillation column to effect a transesterification reaction between the starting and reactant materials in a liquid phase or a gas-liquid phase in the presence of a metal-containing catalyst, while continuously withdrawing a high boiling point reaction mixture containing a produced alkyl phenyl carbonate, diphenyl carbonate or a mixture thereof in liquid form from a lower portion of the distillation column, and continuously withdrawing a low boiling point reaction mixture containing a by-product in gaseous form from an upper portion of the distillation column by distillation. In this instance, a single continuous multi-stage distillation column may be used alone, or a plurality of continuous multi-stage distillation columns may be used in combination. As a specific example of the method in which a plurality of continuous multi-stage distillation columns are used, there can be mentioned a method in which a dialkyl carbonate is reacted with phenol in a first multi-stage distillation column to obtain a reaction mixture containing an alkyl phenyl carbonate at the bottom of the column, while withdrawing an aliphatic alcohol from the top of the column, and the reaction mixture obtained at the bottom of the column is fed to a second multi-stage distillation column to disproportionate the alkyl phenyl carbonate into diphenyl carbonate and a by-produced dialkyl carbonate, while withdrawing a reaction mixture containing diphenyl carbonate from the bottom of the column, and withdrawing the by-produced dialkyl carbonate from the top of the column.

In the present invention, the reaction between a dialkyl carbonate and phenol to obtain diphenyl carbonate is performed in the presence of a catalyst. There is no particular limitation on the type of catalyst used, but as catalysts, there may be mentioned, for example:

(lead compounds)

lead oxides, such as PbO, $PbO_2$ and $Pb_3O_4$; lead sulfides, such as PbS and $Pb_2S$; lead hydroxides, such as $Pb(OH)_2$ and $Pb_2O_2(OH)_2$; plumbites, such as $Na_2PbO_2$, $K_2PbO_2$, $NaHPbO_2$ and $KHPbO_2$; plumbates, such as $Na_2PbO_3$, $Na_2H_2PbO_4$, $K_2PbO_3$, $K_2[Pb(OH)_6]$, $K_4PbO_4$, $Ca_2PbO_4$ and $CaPbO_3$; lead carbonates and basic salts thereof, such as $PbCO_3$ and $2PbCO_3.Pb(OH)_2$; lead salts of organic acids, and carbonates and basic salts thereof, such as $Pb(OCOCH_3)_2$, $Pb(OCOCH_3)_4$ and $Pb(OCOCH_3)_2.PbO.3H_2O$; organolead compounds, such as $Bu_4Pb$, $Ph_4Pb$, $Bu_3PbCl$, $Ph_3PbBr$, $Ph_3Pb$ (or $Ph_6Pb_2$), $Bu_3PbOH$ and $Ph_3PbO$ wherein Bu represents a butyl group and Ph represents a phenyl group; alkoxylead compounds and aryloxylead compounds, such as $Pb(OCH_3)_2$, $(CH_3O)Pb(OPh)$ and $Pb(OPh)_2$; lead alloys, such as Pb-Na, Pb-Ca, Pb-Ba, Pb-Sn and Pb-Sb; lead minerals, such as galena and zinc blende; and hydrates of these lead compounds;

(copper family metal compounds)

salts or complexes of copper family metals, such as CuCl, $CuCl_2$, CuBr, $CuBr_2$, CuI, $CuI_2$; $Cu(OAc)_2$, $Cu(acac)_2$, copper oleate, $Bu_2Cu$, $(CH_3O)_2Cu$, $AgNO_3$, AgBr, silver picrate, $AgC_6H_6ClO_4$, $Ag(bullvalene)_3NO_3$, $[AuC\equiv C-C(CH_3)_3]_n$ and $[Cu(C_7H_8)Cl]_4$ wherein acac represents an acetylacetone chelate ligand;

(alkali metal complexes)

alkali metal complexes, such as Li(acac) and $LiN(C_4H_9)_2$;

(zinc complexes)

zinc complexes, such as $Zn(acac)_2$;

(cadmium complexes)

cadmium complexes, such as $Cd(acac)_2$;

(iron family metal compounds)

iron family metal complexes, such as Fe(C₁₀H₈)(CO)₅, Fe(CO)₅, Fe(C₄H₆)(CO)₃, Co(mesitylene)₂(PEt₂Ph)₂, CoC₅F₅(CO)₇, Ni-π-C₅H₅NO and ferrocene;

(zirconium complexes)

zirconium complexes, such as Zr(acac)₄ and zirconocene;

(Lewis acids and Lewis acid-forming compounds)

Lewis acids and Lewis acid-forming transition metal compounds, such as AlX₃, TiX₃, TiX₄, VOX₃, VX₅, ZnX₂, FeX₃ and SnX₄ wherein X represents a halogen atom, an acetoxy group, an alkoxy group or an aryloxy group; and (organotin compounds)

organotin compounds, such as (CH₃)₃SnOCOCH₃, (C₂H₅)₃SnOCOC₆H₅, Bu₃SnOCOCH₃, Ph₃SnOCOCH₃, Bu₂Sn(OCOCH₃)₂, Bu₂Sn(OCOC₁₁H₂₃)₂, Ph₃SnOCH₃, (C₂H₅)₃SnOPh, Bu₂Sn(OCH₃)₂, Bu₂Sn(OC₂H₅)₂, Bu₂Sn(OPh)₂, Ph₂Sn(OCH₃)₂, (C₂H₅)₃SnOH, Ph₃SnOH, Bu₂SnO, (C₈H₁₇)₂SnO, Bu₂SnCl₂ and BuSnO(OH).

These catalysts are effective even when they are reacted with an organic compound present in the reaction system, such as an aliphatic alcohol, an aromatic monohydroxy compound, an alkyl aryl carbonate, a diaryl carbonate and a dialkyl carbonate. Those which are obtained by heat-treating these catalysts together with a starting material, a reactant and/or a reaction product thereof prior to the use in the process of the present invention can also be used.

It is preferred that the catalyst have high solubility in the liquid phase of the reaction system. Preferred examples of catalysts include Pb compounds, such as PbO, Pb(OH)₂ and Pb(OPh)₂; Ti compounds, such as TiCl₄ and Ti(OPh)₄; Sn compounds, such as SnCl₄, Sn(OPh)₄, Bu₂SnO and Bu₂Sn(OPh)₂; Fe compounds, such as FeCl₃, Fe(OH)₃ and Fe(OPh)₃; and reaction products of the above metal compounds with phenol or reaction mixture.

In the present invention, it is possible to use a catalyst which is not completely soluble in the liquid phase of the reaction system. In this case, from a practical viewpoint, it is important that the catalyst be in a form (for example, a slurry form) such that the catalyst can exert satisfactory catalyst activity in the reaction system.

The amount of the catalyst used in the present invention varies depending on the type thereof, the types of dialkyl carbonate and weight ratio of a dialkyl carbonate to phenol, the reaction conditions, such as reaction temperature and reaction pressure, and the like. Generally, the amount of the catalyst is in the range of from 0.0001 to 30% by weight, based on the total weight of the dialkyl carbonate and phenol. In the present invention, the ratio of a dialkyl carbonate to phenol is not specifically limited and it may vary depending on the type and amount of a catalyst and the reaction conditions, however in general, the molar ratio of phenol to a dialkyl carbonate is within the range of from 0.01 to 1.000.

In the present invention, the reaction time (or the residence time when the reaction is continuously conducted) for the reaction between a dialkyl carbonate and phenol is not specifically limited, but it is generally in the range of from 0.001 to 50 hours, preferably from 0.01 to 10 hours, more preferably from 0.05 to 5 hours. The reaction temperature may vary depending on the type of dialkyl carbonate to be used, but is generally in the range of from 50° to 350° C., preferably from 100° to 280° C. The reaction pressure may vary depending on the type of dialkyl carbonate and the reaction temperature, and it may be any of a reduced pressure, an atmospheric pressure and a superatmospheric pressure. However, the reaction pressure is generally in the range of from 13.3 Pa (0.1 mmHg) to 19.7 MPa (200 kg/cm².G). In producing a diphenyl carbonate, use of a solvent is not required. However, for the purpose of facilitating the reaction operation, an inert solvent, such as an ether, an aliphatic hydrocarbon, an aromatic hydrocarbon or a halogenated aromatic hydrocarbon, may be used as a reaction solvent.

Hereinbelow, an explanation will be made on the method for producing an aromatic polycarbonate from diphenyl carbonate and an aromatic dihydroxy compound.

There is no particular limitation with respect to the mode of polymerization reaction to be employed. Any of known polymerizers for use in producing an aromatic polycarbonate by the transesterification process can be used in the method of the present invention. Examples of various known reaction modes usable in the method of the present invention include a reaction mode in which an agitation type polymerizer, a thin-film evaporation type polymerizer, a screw type polymerizer or the like is used, a reaction mode in which a polymerizing material is allowed to pass downwardly through a perforated plate and fall freely to thereby effect a polymerization during the free-fall, a reaction mode in which a polymerizing material is allowed to pass downwardly through a perforated plate having a guide extending downwardly therefrom and fall along and in contact with the guide to thereby effect a polymerization during the fall along and in contact with the guide, and a reaction mode in which a solid state polymerization is effected. For producing a high quality aromatic polycarbonate, especially preferred reaction modes are a reaction mode in which a polymerizing material is allowed to pass downwardly through a perforated plate and fall freely to thereby effect a polymerization during the free-fall (see Unexamined Japanese Patent Application Laid-Open Specification No. 7-292097), and a reaction mode in which a solid state polymerization is effected (see in Examined Japanese Patent Application Publication No. 7-94546 and Unexamined Japanese Patent Application Laid-Open Specification No. 3-223330). It is also preferred that these reaction modes be employed in combination.

The ratio in which the aromatic dihydroxy compound and the diphenyl carbonate are used (i.e., a charging ratio) may vary depending on the type of the aromatic dihydroxy compound employed, the polymerization temperature and other polymerization conditions. The diphenyl carbonate is generally used in an amount of from 0.9 to 2.5 moles, preferably from 0.95 to 2.0 moles, more preferably from 0.98 to 1.5 moles, per mole of the aromatic dihydroxy compound.

The weight average molecular weight of the aromatic polycarbonate obtained according to the method of the present invention is generally from 500 to 100,000, preferably from 2,000 to 30,000.

In the present invention, the reaction temperature for reacting the aromatic dihydroxy compound with the diaryl carbonate is generally in the range of from 50° to 350° C., preferably from 100° to 290° C.

As the reaction proceeds, phenol is by-produced. By removing phenol from the reaction system, the reaction rate can be increased. Therefore, in the method of the present invention, it is preferable to employ a method in which an inert gas which does not adversely affect the reaction, such as nitrogen, argon, helium, carbon dioxide and a lower hydrocarbon gas, is introduced so that the by-produced aromatic monohydroxy compound is entrained by the inert gas, and the inert gas entraining the aromatic monohydroxy compound is withdrawn to remove the aromatic monohydroxy compound, or a method in which the reaction is carried out under reduced pressure. The preferred reaction pressure may vary depending on the type and the molecular weight of the aromatic polycarbonate to be produced, and the polymerization temperature. For example, in the case of a reaction in which an aromatic polycarbonate is produced from bisphenol A and diphenyl carbonate, when the number average molecular weight of the aromatic polycarbonate is less than 1,000, the reaction pressure is preferably from 6,665 Pa (50 mmHg) to atmospheric pressure. In this case, when the number average molecular weight is from 1,000 to 2,000, the reaction pressure is preferably from 400 Pa (3 mmHg) to 6,665 Pa (50 mmHg). When the number average molecular weight is greater than 2,000, the reaction pressure is preferably 2,666 Pa (20 mmHg) or less, more preferably 1,333 Pa (10 mmHg) or less, most preferably 267 Pa (2 mmHg) or less. It is preferred that the reaction be performed under reduced pressure while introducing the above-mentioned inert gas.

When the by-product phenol obtained in the production of the aromatic polycarbonate is removed from the reaction system, the by-product phenol may be accompanied with diphenyl carbonate, an aromatic dihydroxy compound, an oligomer and the like. However, as described above, it is preferred that the content of an aromatic dihydroxy compound in the by-product phenol used in the present invention be 50 ppm by weight or less. The content of an aromatic dihydroxy compound in the by-product phenol can be controlled to a level in the range of 50 ppm by weight or less by distillation or the like. By distillation or the like, not only the aromatic dihydroxy compound but also the diphenyl carbonate, the oligomer and the like can be separated from the by-product phenol. It is preferred that the diphenyl carbonate, the aromatic dihydroxy compound, the oligomer and the like which have been separated from the by-product phenol by distillation or the like to reduce the content of the aromatic dihydroxy compound in the by-product phenol to 50 ppm by weight or less be recycled to the polymerizer used in the production of the aromatic polycarbonate.

A transesterification reaction can be carried out in the absence of a catalyst. However, if it is desired to accelerate the polymerization, the polymerization can be effected in the presence of a catalyst. The polymerization catalysts which are customarily used in the art can be used without particular limitation. Examples of such catalysts include hydroxides of an alkali metal and of an alkaline earth metal, such as lithium hydroxide, sodium hydroxide, potassium hydroxide and calcium hydroxide; alkali metal salts of, alkaline earth metal salts of and quaternary ammonium salts of boron hydride and of aluminum hydride, such as lithium aluminum hydride, sodium boron hydride and tetramethyl ammonium boron hydride; hydrides of an alkali metal and of an alkaline earth metal, such as lithium hydride, sodium hydride and calcium hydride; alkoxides of an alkali metal and of an alkaline earth metal, such as lithium methoxide, sodium ethoxide and calcium methoxide; aryloxides of an alkali metal and of an alkaline earth metal, such as lithium phenoxide, sodium phenoxide, magnesium phenoxide, LiO-Ar-OLi wherein Ar represents an aryl group, and NaO-Ar-ONa wherein Ar is as defined above; organic acid salts of an alkali metal and of an alkaline earth metal, such as lithium acetate, calcium acetate and sodium benzoate; zinc compounds, such as zinc oxide, zinc acetate and zinc phenoxide; boron compounds, such as boron oxide, boric acid, sodium borate, trimethyl borate, tributyl borate, triphenyl borate, ammonium borates represented by the formula: $(R^3 R^4 R^5 R^6)NB(R^3 R^4 R^5 R^6)$, and phosphonium borates represented by the formula: $(R^3, R^4 R^5 R^6)PB(R^3 R^4 R^5 R^6)$, wherein $R^3$ $R^4$ $R^5$ and $R^6$ are as defined above; silicon compounds, such as silicon oxide, sodium silicate, tetraalkylsilicon, tetraarylsilicon and diphenyl-ethyl-ethoxysilicon; germanium compounds, such as germanium oxide, germanium tetrachloride, germanium ethoxide and germanium phenoxide; tin compounds, such as tin oxide, dialkyltin oxide, dialkyltin carboxylate, tin acetate, tin compounds having an alkoxy group or aryloxy group bonded to tin, such as ethyltin tributoxide, and organotin compounds; lead compounds, such as lead oxide, lead acetate, lead carbonate, basic lead carbonate, and alkoxides and aryloxides of lead or organolead; onium compounds, such as a quaternary ammonium salt, a quaternary phosphonium salt and a quaternary arsonium salt; antimony compounds, such as antimony oxide and antimony acetate; manganese compounds, such as manganese acetate, manganese carbonate and manganese borate; titanium compounds, such as titanium oxide and titanium alkoxides and titanium aryloxide; and zirconium compounds, such as zirconium acetate, zirconium oxide, zirconium alkoxide, zirconium aryloxide and zirconium acetylacetone.

The catalysts can be used individually or in combination. The amount of the catalysts to be used is generally in the range of from $10^{-8}$ to 1% by weight, preferably from $10^{-7}$ to $10^{-1}$% by weight, based on the weight of the aromatic dihydroxy compound.

With respect to materials for constructing the polymerizers to be used in the method of the present invention, there is no particular limitation. Moreover, stainless steel, nickel or glass is generally used as a material for at least inner wall portions of polymerizers.

BEST MODE FOR CARRYING OUT THE INVENTION

Hereinbelow, the present invention will be described in more detail with reference to the following Examples and Comparative Examples, but they should not be construed as limiting the scope of the present invention.

In the following Examples and Comparative Examples, various properties were measured as follows.

(1) Measurement of the purity of phenol:

The purity of phenol was measured by high performance liquid chromatography (HPLC) (SCL-6B, manufactured and sold by Shimadzu Corporation, Japan).

(2) Measurement of the weight average molecular weight of a polycarbonate:

The weight average molecular weight of an aromatic polycarbonate were measured by gel permeation chromatography (GPC) (column: TSK-GEL, manufactured and sold by Tosoh Corp., Japan; and solvent: THF).

(3) Evaluation of the color of an aromatic polycarbonate:

An aromatic polycarbonate was subjected to molding, by means of an injection molding machine (J100E, manufactured and sold by THE JAPAN STEEL WORKS. LTD., Japan), at a cylinder temperature of 290° C. and a mold temperature of 90° C. to obtain a test specimen having a 50 mm length, a 50 mm width and a 3.2 mm thickness. The color of the aromatic polycarbonate was evaluated, using the specimen, in accordance with the CIELAB method (Comission Internationale de l'Eclairage 1976 L*a*b* Diagram), and the yellowness of the specimen is expressed in terms of the b*-value. The larger the b*-value of the specimen, the higher the yellowness of the specimen.

(4) Evaluation of the melt stability of an aromatic polycarbonate at high temperatures:

An aromatic polycarbonate was subjected to continuous molding, by means of an injection molding machine (J100E, manufactured and sold by THE JAPAN STEEL WORKS. LTD., Japan), at a cylinder temperature of 350° C. and a mold temperature of 90° C., and at a molding cycle of 45 seconds, to thereby obtain 20 test specimens each having a 216 mm length, a 12.6 mm width and a 3.2 mm thickness (specimen a). The aromatic polycarbonate remaining in the molding machine was allowed to stand at 350° C. for 60 minutes. Subsequently, the aromatic polycarbonate was subjected to molding at a cylinder temperature of 350° C. and a mold temperature of 90° C., to thereby obtain a 60-minutes heated specimen (specimen b). Substantially the same procedure as in the preparation of specimens a was repeated, to thereby obtain 20 molded products corresponding to specimen a (which molded products were not used in the evaluation mentioned below). Then, the aromatic polycarbonate remaining in the molding machine was allowed to stand in the molding machine for 30 minutes. Subsequently, the aromatic polycarbonate was subjected to molding under the same conditions as in the preparation of specimen b, to thereby obtain a 30-minutes heated specimen (specimen c). The color of the aromatic polycarbonate was evaluated with respect to specimens a, b and c, in accordance with the CIELAB method (Commission Internationale de l'Eclairage 1976 L*a*b* Diagram), and the yellowness of the specimen is expressed in terms of the b*-value (the b*-value of specimen a is average value of ten specimen a's). The difference in yellowness (which difference is expressed in terms of the Δb*60) between specimen a and specimen b was taken as an index of the thermal stability (melt stability) of the aromatic polycarbonate. The difference in yellowness (which difference is expressed in terms of the Δb*30) between specimen a and specimen c was also determined as reference. The smaller the Δb*-value of the specimen, the higher the thermal stability in molten state of the aromatic polycarbonate.

EXAMPLE 1

(Preparation of catalyst)

A mixture of 20 kg of phenol and 4 kg of lead monoxide was heated to and maintained at 180° C. for 10 hours, thereby performing a reaction. After that period of time, water formed in the resultant mixture was distilled off together with unreacted phenol, to thereby obtain a lead catalyst.

(Production of aromatic polycarbonate)

Figure 1:
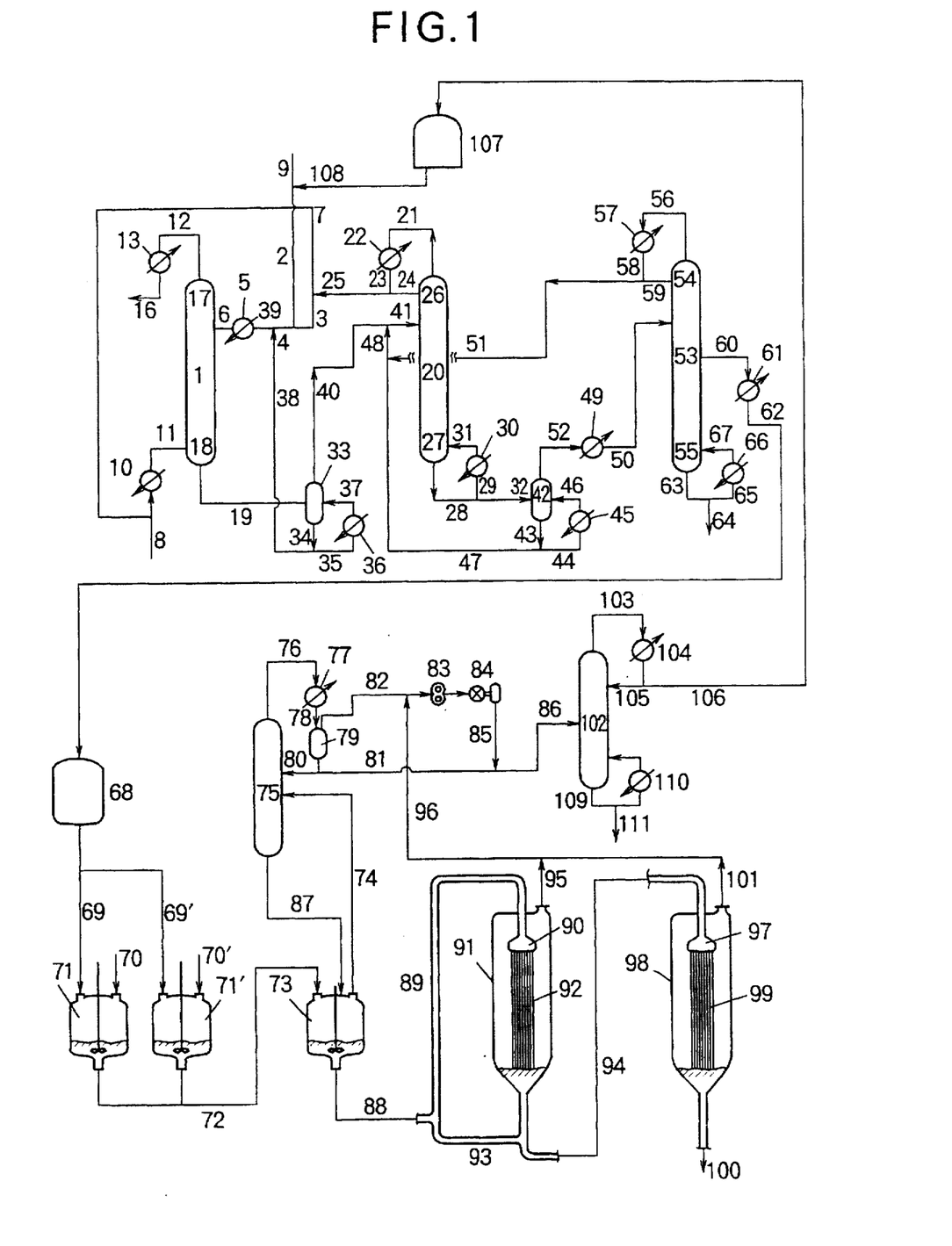
FIG. 1 is a diagram showing an example of a system for practicing the method of the present invention.

An aromatic polycarbonate was produced in accordance with a system as shown in FIG. 1. The system of FIG. 1 comprises (i) a first stage and a second stage reactive distillation (conducted using continuous multi-stage distillation columns 1 and 20, respectively) for producing diphenyl carbonate, (ii) a first stage and a second stage agitation polymerization [conducted using agitation type polymerizer vessels 71, 71' and agitation type polymerizer vessel 73, respectively] for producing a prepolymer while withdrawing by-producing phenol which is recycled to the above-mentioned continuous multi-stage distillation column 1, (iii) a free-fall polymerization (conducted using free-fall polymerizer 91) for increasing the degree of polymerization of the prepolymer while withdrawing by-producing phenol which is recycled to the above-mentioned continuous multi-stage distillation column 1, and (iv) a guide-wetting fall polymerization (conducted using guide-wetting fall polymerizer 98) for producing an aromatic polycarbonate while withdrawing by-producing phenol which is recycled to the above-mentioned continuous multi-stage distillation column 1.

At the initial stage of the operation, a mixture of fresh phenol having a purity of 99.97% (content of the total of cresol and xylenol: 200 ppm by weight; content of an aromatic dihydroxy compound: 80 ppm by weight), fresh dimethyl carbonate and the above-mentioned lead catalyst was fed from an inlet provided on conduit 39 (not shown) to first continuous multi-stage distillation column 1 (comprised of a plate column having a height of 6 m and equipped with 20 sieve trays) at a position of 0.5 m below the top 17 thereof at a flow rate of 23.8 kg/hr through conduit 6, thereby allowing the mixture to flow down inside multi-stage distillation column 1 so as to perform a reaction. The composition of the mixture fed from conduit 6 during the initial stage of the operation was as follows: fresh dimethyl carbonate: 54.6% by weight; fresh phenol: 44.6% by weight; and lead catalyst: 0.43% by weight, in terms of the Pb concentration in the mixture. Further fresh dimethyl carbonate was fed at a flow rate of 42.2 kg/hr from conduit 8 to bottom 18 of first continuous multi-stage distillation column 1. When the feeding of each of a liquid recycled through conduit 38 and a liquid recycled through conduits 24, 25, 3 and 4 to conduit 39 was started, the feeding of the mixture from the inlet provided on conduit 39 was stopped. Subsequently, fresh phenol (which is the same phenol as the above-mentioned fresh phenol) was fed from conduit 9 to conduit 2 at a flow rate of 3.45 kg/hr. During the operation of the entire system of FIG. 1, by-product phenol in tank 107 (which was the by-product phenol whithdrawn from the polymerization reaction systems of the system of FIG. 1) was led through conduit 108 to conduit 2 at a flow rate of 3.3 kg/hr and the fresh phenol was fed from conduit 9 to conduit 2 at a flow rate of 0.15 kg/hr, so that a liquid in conduit 2 was a mixture of the fresh phenol and the by-product phenol, in which the content of the by-product phenol in the mixture (flowed at 3.45 kg/hr) in conduit 2 became 96% by weight. After the operation reached a steady state (i.e., 200 hours after the start of the operation), the mixture in conduit 6 had the following composition: phenol: 44.6% by weight; dimethyl carbonate: 49.8% by weight; methyl phenyl carbonate: 4.8% by weight; and lead catalyst: 0.43% by weight, in terms of the Pb concentration of the mixture [the mixture in conduit 6 was comprised of a liquid introduced from conduit 2 (i.e., a mixture of the fresh phenol and the by-product-phenol), a liquid recycled from second continuous multi-stage distillation column 20 through conduits 24, 25 and 3, and a liquid recycled from evaporator 33 through conduits 34 and 38]. The content of each of phenol, dimethyl carbonate and methyl phenyl carbonate in the above mixture, and the purity of the phenol in the mixture were measured by high performance liquid chromatography (SCL-6B, manufactured and sold by Shimadzu Corporation, Japan). The content of the lead catalyst in the above-mixture was measured by an ICP (industry coupled plasma emission spectral analyzer), using JY38PII (manufactured and sold by Seiko Electronics Co., Ltd., Japan).

First continuous multi-stage distillation column 1 was operated under conditions such that the temperature at the column bottom was 203° C., the pressure at the column top was 6.5 kg/cm²-G, and the reflux ratio was 0.

In first continuous multi-stage distillation column 1, a heat necessary for performing the reaction and distillation was supplied from a mixture of the fresh dimethyl carbonate fed from conduit 8 and a portion of a low boiling point reaction mixture containing unreacted dimethyl carbonate withdrawn from top 26 of second continuous multi-stage distillation column 20 and recycled through condenser 22 and conduits 23, 25 and 7, which mixture was heated in evaporator 10.

Gas distilled from top 17 of first continuous multi-stage distillation column 1 was led into condenser 13 through conduit 12, in which the gas was condensed. A low boiling point mixture containing by-produced methanol was continuously withdrawn from conduit 16 at a flow rate of 42.3 kg/hr.

A reaction mixture was continuously withdrawn from bottom 18 of first continuous multi-stage distillation column 1 at a flow rate of 23.6 kg/hr and led into first evaporator 33 through conduit 19. In first is evaporator 33, an evaporation-concentrated liquid containing the lead catalyst was formed. A portion of the concentrated liquid was led into preheater 5 through conduits 34, 38 and 39 and recycled to first continuous multi-stage distillation column 1 through conduit 6. The rest of the concentrated liquid was recycled to first evaporator 33 through conduit 35, reboiler 36 and conduit 37.

An evaporated gas containing methyl phenyl carbonate withdrawn through conduit 40 at a flow rate of 22.3 kg/hr was continuously fed from conduit 41 to second continuous multi-stage distillation column 20 (a column having a height of 6 m, which is comprised of a plate column equipped with 20 sieve trays) at a position 1.5 m below top 26 thereof, in which most of the methyl phenyl carbonate fed through conduit 40 was allowed to flow down in liquid form inside second continuous multi-stage distillation column 20, thereby performing a reaction in the presence of the above-mentioned lead catalyst which was fed to second continuous multi-stage distillation column 20 from a nozzle (not shown) provided on conduit 47 through conduits 48 and 41. The lead catalyst was used in an amount such that the Pb concentration of a mixture in conduit 41 was maintained at 0.8% by weight. After the operation reached a steady state (i.e., 200 hours after the start of the operation), the mixture in conduit 41 was fed to second continuous multi-stage distillation column 20 at a flow rate of 23.6 kg/hr. The composition of the mixture in conduit 41 was as follows: dimethyl carbonate: 43.1% by weight; phenol 24.5% by weight; methyl phenyl carbonate: 27.1% by weight; and lead catalyst: 0.80% by weight, in terms of the Pb concentration of the mixture in conduit 41. The above-mentioned mixture in conduit 41 was comprised of the evaporated gas containing methyl phenyl carbonate fed from conduit 40, an evaporation concentrated liquid formed in second evaporator 42 and withdrawn through conduit 47, and a liquid fed through conduit 51 which was formed by condensation in condenser 58 of a gas distilled from purification column 53 for diphenyl carbonate.

Second continuous multi-stage distillation column 20 was operated under conditions such that the temperature at the column bottom was 198° C., the pressure at the column top was 280 mmHg, and the reflux ratio was 1.5. A heat necessary for performing the reaction and distillation was supplied from a column bottom liquid heated by means of reboiler 30.

A gaseous low boiling point reaction mixture containing dimethyl carbonate, which was distilled from top 26 of second continuous multi-stage distillation column 20, was led into condenser 22 through conduit 21, in which the gaseous mixture was condensed. A portion of the resultant condensate was refluxed to second continuous multi-stage distillation column 20 through conduits 23 and 24. The rest of the condensate in condenser 22 was continuously withdrawn through conduits 23 and 25, and recycled to first continuous multi-stage distillation column 1 through preheater 5 and conduit 6. A portion of the condensate in conduit 25 was recycled to bottom 18 of first continuous multi-stage distillation column 1 through conduit 7, evaporator 10 and conduit 11. A high boiling point reaction mixture containing the catalyst and diphenyl carbonate was continuously withdrawn from bottom 27 of second continuous multi-stage distillation column 20 and led into second evaporator 42 through conduits 28 and 32. In second evaporator 42, an evaporation-concentrated liquid containing the lead catalyst was formed. A portion of the concentrated liquid was recycled to second evaporator 42 through conduit 44, reboiler 45 and conduit 46. The rest of the concentrated liquid withdrawn was recycled to second continuous multi-stage distillation column 20 through conduits 43, 47, and 48. On the other hand, an evaporated gas (having a diphenyl carbonate content of 98.3% by weight) formed in second evaporator 42 was led into condenser 49 at a flow rate of 4 kg/hr through conduit 52, in which the gas was condensed. The resultant condensate was fed into purification column 53 for diphenyl carbonate through conduit 50. In purification column 53, a heat needed to conduct distillation was supplied from the column bottom liquid heated by means of reboiler 66. A gaseous low boiling point mixture containing phenol and methyl phenyl carbonate distilled from top 54 of purification column 53 was led through conduit 56 into condenser 57, in which the gas was condensed. A portion of the resultant condensate was recycled to purification column 53 through conduits 58 and 59. The rest of the condensate was recycled to second continuous multi-stage distillation column 20 through conduits 58, 51, 48 and 41. A portion of the reaction mixture at bottom 55 of purification column 53 was withdrawn through conduits 63 and 64, and the rest of the reaction mixture was recycled to column bottom 55 through conduits 63, 65, reboiler 66, and conduit 67. Purified diphenyl carbonate was withdrawn from purification column 53 at middle portion thereof and led at a flow rate of 3.9 kg/hr through conduit 60, condenser 61 and conduit 62 into accumulation tank 68 for purified diphenyl carbonate.

The first stage agitation type polymerization was batchwise conducted in first stage agitation type polymerizer vessels 71 and 71'. The polymerization reaction conditions in both of first stage agitation type polymerizer vessels 71 and 71' were as follows: the reaction temperature was 180° C., the reaction pressure was atmospheric pressure, and the flow rate of nitrogen gas was 1 liter/hr.

In operation, 40 kg of diphenyl carbonate in accumulation tank 68 was batchwise charged into first stage agitation type polymerizer vessel 71 through conduit 69. Then, 40 kg of bisphenol A was batchwise charged into first stage agitation type polymerizer vessel 71 through conduit 70. The resultant monomer mixture in polymerizer 71 was polymerized in a molten state while agitating for 4 hours to obtain a molten prepolymer (a). The obtained molten prepolymer (a) was continuously fed to second stage agitation type polymerizer 73 at a flow rate of 7.8 kg/hr through conduit 72. While feeding molten prepolymer (a) obtained in first stage agitation type polymerizer vessel 71 to second stage agitation type polymerizer vessel 73, 40 kg of diphenyl carbonate in accumulation tank 68 was batchwise charged into first agitation type polymerizer vessels 71' through conduit 69 and then, 40 kg of bisphenol A was batchwise charged into first stage agitation type polymerizer vessel 71' through conduit 70', whereupon first stage agitation type polymerizer vessel 71' was operated to polymerize the resultant monomer mixture in the same manner as in the agitation polymerization in first stage agitation type polymerizer vessel 71, to thereby obtain a molten prepolymer (b). When first stage agitation type polymerizer vessel 71 became empty, the feeding of molten prepolymer (b) from first stage agitation type polymerizer vessel 71' to second stage agitation type polymerizer vessel 73 was started, and molten prepolymer (b) was continuously fed to second agitation type polymerizer at a flow rate of 7.8 kg/hr. With respect to the batchwise polymerization in first agitation type polymerizer vessels 70 and 70' and to the alternate feedings of molten prepolymers (a) and (b) from polymerizers 70 and 70', the same operations as mentioned above were repeated, so that the prepolymer [either molten prepolymer (a) or molten prepolymer (b), alternately] was continuously fed to second agitation type polymerizer vessel 73.

In second agitation type polymerizer vessel 73, a further agitation polymerization of molten prepolymers (a) and (b), alternately fed from first agitation polymerizer vessels 71 and 71', was continuously carried out under polymerization reaction conditions such that the reaction temperature was 240° C., and the reaction pressure was 70 mmHg, thereby obtaining prepolymer (c).

When the volume of prepolymer (c) in second stage agitation type polymerizer vessel 73 reached 20 liters, a portion of prepolymer (c) was continuously fed to free-fall polymerizer 91 through conduits 88 and 89 at a rate such that the volume of prepolymer (c) in second stage agitation type polymerizer vessel 73 was constantly maintained at 20 liters.

An evaporated gas (containing phenol by-produced during the polymerization) distilled from second stage agitation-type polymerizer vessel 73 was fed to distillation column 75 through conduit 74, and a column bottom liquid comprised mainly of diphenyl carbonate was recycled from the bottom of distillation column 75 to second stage agitation type polymerizer vessel 73 through conduit 87. An evaporated gas distilled from the column top of distillation column 75, which was comprised mainly of phenol, was led into condenser 77 through conduit 76, in which the gas was condensed, and the resultant condensate was led into gas-liquid separator 79 through conduit 78. A portion of the liquid formed in gas-liquid separator 79 was refluxed to distillation column 75 through conduit 80. The rest of the liquid was fed to phenol recovering column 102 through conduits 81 and 86. Gas separated in gas-liquid separator 79 was led into roots blower 83 through conduit 82 and was led into liquid seal-type vacuum pump 84, in which a sealing liquid is comprised mainly of phenol.

In free-fall polymerization of prepolymer (c), free-fall polymerizer 91 was used. Free-fall polymerizer 91 has a perforated plate 90 which has 80 holes having a diameter of 5 mm. The free-fall distance is 4 m. In free-fall polymerizer 91, prepolymer (c) fed to the feeding zone (having perforated plate 90) from conduit 89 was allowed to pass through perforated plate 90 and fall freely in the form of filaments 92 to perform a free fall polymerization under conditions such that the reaction temperature was 250° C. and the reaction pressure was 5 mmHg, thereby obtaining prepolymer (d), while recycling a portion of prepolymer (d) to the feeding zone of polymerizer 91 through conduits 93 and 89 at a flow rate of 50 kg/hr. An evaporated gas (containing phenol by-produced during polymerization) distilled from the top of first free-fall polymerizer 91 was led into liquid-seal type vacuum pump 84 through conduits 95 and 96, and roots blower 83. When the volume of prepolymer at the bottom of free-fall polymerizer 91 reached a predetermined level, a portion of prepolymer (d) was continuously fed to wire-wetting fall polymerizer 98 at a rate such that the volume of prepolymer (d) in free-fall polymerizer (d) was constantly maintained at the predetermined level.

Wire-wetting fall polymerizer 98 has a perforated plate 97 which has 80 holes having a diameter of 5 mm. In wire-wetting fall polymerizer 98, 80 strands of 1 mm øSUS 316 L wires 99 are hung vertically from the respective holes of perforated plate 97 to the reservoir portion at the bottom of wire-wetting fall polymerizer 98 so that a polymerizing material will not fall freely (i.e., free fall) but fall along and in contact with the wires 99 (i.e., wire-wetting fall). The wire-wetting fall distance is 8 m.

In wire-wetting fall polymerizer 98, a wire-wetting polymerization was continuously carried out under polymerization reaction conditions such that the reaction temperature was 265° C. and the reaction pressure was 0.3 mmHg, while withdrawing the produced aromatic polycarbonate from the bottom of wire-wetting polymerizer 98 at a flow rate of 4.3 kg/hr.

An evaporated gas (containing phenol by-produced during the polymerization) distilled from the top of wire-wetting polymerizer 98 was led into liquid seal-type vacuum pump 84 through conduits 101, 96 and roots blower 83. Sealing liquid in liquid seal-type vacuum pump 84 was withdrawn through conduit 85 so as to constantly maintain the amount of the liquid in pump 84 at a predetermined level, and the withdrawn liquid was fed into phenol recovering column 102 through conduit 86. In phenol recovering column 102, a heat needed to conduct distillation was supplied from the column bottom liquid heated by means of reboiler 110. Phenol distilled from the top of phenol recovering column 102 was led through conduit 103 into condenser 104, in which the gas was condensed. A portion of the condensate was refluxed to phenol recovering column 102 through conduit 105. The rest of the condensate was fed at a flow rate of 3.3 kg/hr through conduit 106 into accumulation tank 107 for by-product phenol. The purity of phenol in accumulation tank 107 for phenol was 99.995% by weight (content of the total of cresol and xylenol: 30 ppm by weight; content of aromatic dihydroxy compound: 20 ppm by weight.) A portion of the liquid at the bottom of phenol recovering column 102 was withdrawn out of the system through conduits 109 and 111.

The above operation using the system of FIG. 1 was continuously carried out for 700 hours to obtain an aromatic polycarbonate.

The aromatic polycarbonate obtained 700 hours after the start of the operation had a weight average molecular weight of 30,000. With respect to the obtained aromatic polycarbonate, the color and melt stability at high temperatures were evaluated. As a result, it was found that the specimen of the aromatic polycarbonate was colorless transparent (b*-value: 3.3) and the Δb*60 value and the Δb*30 value were 1.2 and 0.5, respectively. The results are shown in Table 1, together with the purity of the phenols in conduits 2, 9, and 108.

During 700 hours of the operation time of the system of FIG. 1, both the operation for producing diphenyl carbonate and the operation for polymerization were stably conducted (for example, both of the flow and the composition in each conduit were stable) without suffering disadvantageous phenomena, such as deposition of the catalyst on the inner wall of the apparatuses and clogging of the conduits and the like.

EXAMPLES 2 to 6

Aromatic polycarbonates were individually produced in substantially the same manner as in Example 1, except that the composition of the mixture fed from conduit 2 at a flow rate of 3.45 kg/hr (which was a mixture of fresh phenol and by-product phenol) and the purity of fresh phenol fed from conduit 9 were varied as shown in Table 1. Results are shown in Table 1.

In each of Examples 2 to 6, during 700 hours of the operation time of the system of FIG. 1, both the operation for producing diphenyl carbonate and the operation for the polymerization were stably conducted (for example, both of the flow and the composition in each conduit were stable) without suffering disadvantageous phenomena, such as deposition of the catalyst on the inner wall of the apparatuses and clogging of the conduits.

Comparative Examples 1 to 3

Aromatic polycarbonates were individually produced in substantially the same manner as in Example 1, except that the composition of the mixture fed from conduit 2 at a flow rate of 3.45 kg/hr (which was a mixture of fresh phenol and by-product phenol) and the purity of fresh phenol fed from conduit 9 were varied as shown in Table 1. Results are shown in Table 1.

In Comparative Example 2, deposition of the catalyst on the inner wall of first evaporator 33 occurred. Therefore, it was necessary to repeatedly conduct a blow down operation, so as to avoid occurrence of clogging of conduit 34. During the blow down operation, an additional catalyst was introduced to the system to continue the operation. In each of Comparative Examples 1 and 3, during 700 hours of the operation time of the system of FIG. 1, both the operation for producing diphenyl carbonate and the operation for the polymerization were stably conducted (for example, both of the flow and the composition in each conduit were stable) without suffering disadvantageous phenomena, such as deposition of the catalyst on the inner wall of the apparatuses and clogging of the conduits.

Comparative Example 4

An aromatic polycarbonate was produced in substantially the same manner as in Example 1, except the amount of bisphenol A charged at one time into first stage agitation type polymerizer vessel 71 was changed to 44 kg, and that the flow rate of the prepolymer obtained in first stage agitation type polymerizer vessel 71, which was fed to second stage agitation type polymerizer 73, was changed to 8.2 kg/hr. As the result, the flow rate of by-product phenol fed to accumulation tank 107 through conduit 106 became 3.42 kg/hr, and the flow rate of the by-product phenol fed from accumulation tank 107 to conduit 2 through conduit 108 became 3.42 kg/hr (content of the by-product phenol in the mixture in conduit 2: 99.1% by weight). The aromatic polycarbonate obtained 700 hours after the start of the operation had a weight average molecular weight of 27,000. With respect to the obtained aromatic polycarbonate, the color and melt stability at high temperatures were evaluated in accordance with the above-mentioned method. As a result, it was found that the specimen of the aromatic polycarbonate was colorless transparent (b*-value: 3.3); however, the 60-minutes heated specimen was markedly colored (Δb*60 value was as high as 6.8) and Δb*30 was also as high as 2.5.

EXAMPLE 7

An aromatic polycarbonate was produced in substantially the same manner as in Example 1, except that the liquid in conduit 86 was directly led to conduit 108 through accumulation tank 107, without using phenol recovering column 102. The liquid in conduit 108 was a mixture of phenol, diphenyl carbonate, bisphenol A and the like. With respect to the liquid in conduit 108, the content of the total of cresol and xylenol was 30 ppm by weight, and the content of an aromatic dihydroxy compounds was 110 ppm by weight.

The aromatic polycarbonate obtained 700 hours after the start of the operation had a weight average molecular weight of 30,000. With respect to the obtained aromatic polycarbonate, the color and melt stability at high temperatures were evaluated. As a result, it was found that the specimen of the aromatic polycarbonate was colorless transparent (b*-value: 3.4) and the Δb*60 value and the Δb*30 value were advantageously low (1.5 and 0.7, respectively). The results are shown in Table 1.

During 700 hours of the operation time of the system of FIG. 1, deposition of the catalyst on the inner wall of first evaporator 33 occurred. Therefore, it was necessary to repeatedly conduct a blow down operation, so as to avoid occurrence of clogging of conduit 34. During the blow down operation, an additional catalyst was introduced to the system to continue the operation.

EXAMPLE 8

Figure 2:
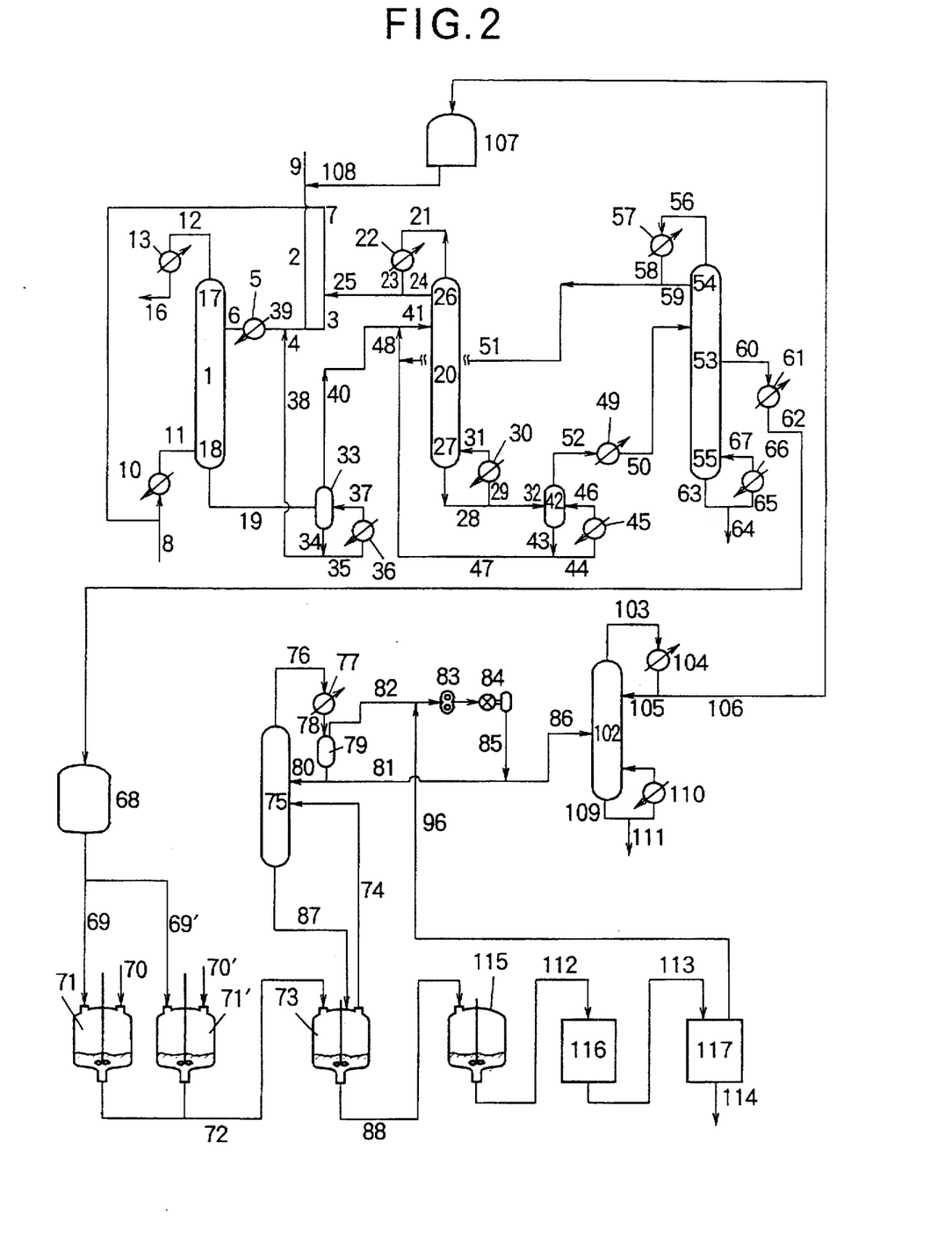
FIG. 2 is a diagram showing another example of a system for practicing the method of the present invention.

An aromatic polycarbonate was produced in accordance with a system as shown in FIG. 2. The system of FIG. 2 comprises (i) a first stage and a second stage reactive distillation (conducted using continuous multi-stage distillation columns 1 and 20, respectively) for producing diphenyl carbonate, (ii) a first stage and a second stage agitation polymerization [conducted using agitation type polymerizer vessels 71, 71' and agitation type polymerizer vessel 73, respectively] for producing a prepolymer while by-producing phenol which is recycled to the above-mentioned continuous multi-stage distillation column 1, (iii) a crystallization (conducted using crystallization vessel 115) for crystallizing a prepolymer, and (iv) a solid state polymerization (conducted using solid-state polymerization reactor 117) for producing an aromatic polycarbonate while by-producing phenol which is recycled to the above-mentioned continuous multi-stage distillation column 1.

Diphenyl carbonate was produced in substantially the same manner as in Example 1, and the first stage and the second stage agitation polymerization (using first agitation type polymerizer vessel 71 and 71') was conducted in substantially the same manner as in Example 1, to thereby obtain molten prepolymer (c'). Prepolymer (c') obtained in second agitation type vessel 73 was fed to crystallization vessel 115 (containing acetone) through conduit 88. In crystallization vessel 115, prepolymer (c') was agitated in acetone at 25° C. to perform crystallization of prepolymer (c'). The resultant mixture containing a crystallized prepolymer and acetone was led into dryer 112 to dry the mixture at 120° C. The resultant residue containing the crystallized prepolymer was fed to solid-state polymerization reactor 117 through conduit 113. In solid-state polymerization reactor 117, a solid-state polymerization was carried out under conditions such that the reaction temperature was 220° C., the reaction pressure was 0.4 mmHg, and the residence time was 8 hours. An evaporated gas (containing phenol by produced during the polymerization) distilled from the top of solid-state polymerization reactor 117 was led into liquid seal-type vacuum pump 84 through conduit 96 and roots blower 83. Sealing liquid in liquid seal-type vacuum pump 84 was withdrawn through conduit 85 so as to constantly maintain the amount of the liquid in pump 84 at a predetermined level, and the withdrawn liquid was fed to phenol recovering column 102 through conduit 86. In phenol recovering column 102, a heat needed to conduct distillation was supplied from the column bottom liquid heated by means of reboiler 110. Phenol distilled from the top of phenol recovering column 102 was led through conduit 103 into condenser 104, in which the gas was condensed. A portion of the condensate was refluxed to phenol recovering column 102 through conduit 105. The rest of the condensate was fed through conduit 106 into accumulation tank 107 for by-product phenol at a flow rate of 3.3 kg/hr. The purity of phenol in accumulation tank 107 was 99.995% by weight (content of the total of cresol and xylenol: 25 ppm by weight; content of an aromatic dihydroxy compound: 25 ppm by weight). A portion of the liquid at the bottom of phenol recovering column 102 was withdrawn out of the system through conduits 109 and 111. During the operation of the entire system of FIG. 2, the content of the by-product phenol in the mixture fed from conduit 2 to first continuous multi-stage distillation column 1 at a flow rate of 3.45 kg/hr (which is a mixture of the fresh phenol and the by-product phenol fed from tank 107) was 96% by weight.

The above operation using the system of FIG. 2 was continuously carried out for 700 hours to obtain an aromatic polycarbonate.

The aromatic polycarbonate obtained 700 hours after the start of the operation, which was withdrawn from solid-state polymerization reactor 117 through conduit 114, had a weight average molecular weight of 29,500. With respect to the obtained aromatic polycarbonate, the color and melt stability at high temperatures were evaluated in accordance with the above-mentioned method. As a result, it was found that the specimen of the aromatic polycarbonate was colorless transparent (b*-value: 3.3) and the $\Delta b^*60$ value and the $\Delta b^*30$ value were 1.1 and 0.4, respectively. The results are shown in Table 1.

During 700 hours of the operation time of the system of FIG. 2, both the operation for producing diphenyl carbonate and the operation for the polymerization were stably conducted (for example, both of the flow and the composition in each conduit were stable) without suffering disadvantageous phenomena, such as deposition of the catalyst on the inner wall of the apparatuses and clogging of the conduits.

INDUSTRIAL APPLICABILITY

According to the method of the present invention, an aromatic polycarbonate having improved melt stability at high temperatures can be stably produced. In the method of the present invention, a by-product phenol obtained in the production of an aromatic polycarbonate is effectively utilized for obtaining diphenyl carbonate used for producing an aromatic polycarbonate. Therefore, the method of the present invention is extremely advantageous especially for the production of an aromatic polycarbonate having excellent melt stability at high temperatures on a large commercial scale.

We claim:

1. A method for producing an aromatic polycarbonate, which comprises:

feeding a feedstock dialkyl carbonate and a feedstock phenol mixture of phenol (a) and phenol (b) which is different in supply source from said phenol (a) to a reactor to effect a reaction between said feedstock dialkyl carbonate and said feedstock phenol mixture in the presence of a catalyst, thereby producing diphenyl carbonate, and polymerizing said diphenyl carbonate with an aromatic dihydroxy compound in a polymerizer to produce an aromatic polycarbonate while producing phenol as a by-product, wherein said by-product phenol is used as said phenol (b), and wherein the content of said phenol (b) in said feedstock phenol mixture is from 70 to 99% by weight.

2. The method according to claim 1, wherein said by-product phenol used as said phenol (b) contains an impurity component ($\alpha$) which is at least one compound selected from the group consisting of cresol and xylenol, and wherein the content of said impurity component ($\alpha$) in said by-product phenol is 50 ppm by weight or less.

3. The method according to claim 1 or 2, wherein said feedstock phenol mixture contains an impurity component ($\alpha$) which is at least one compound selected from the group consisting of cresol and xylenol, and wherein the content of said impurity component ($\alpha$) in said feedstock phenol mixture is 130 ppm by weight or less.

TABLE 1

| | Phenol fed from conduit 9 | | By-product phenol in conduit 108 | | | Feedstock phenol mixture in conduit 2 | | Melt stability of aromatic polycarbonate at high temperatures | | |
|---|---|---|---|---|---|---|---|---|---|---|
| | Content of cresol and xylenol (ppm by weight) | Content of aromatic dihydroxy compound (ppm by weight) | Content of cresol and xylenol (ppm by weight) | Content of aromatic dihydroxy compound (ppm by weight) | By-product phenol content of phenol mixture in conduit 2 (wt %) | Content of cresol and xylenol (ppm by weight) | Content of aromatic dihydroxy compound (ppm by weight) | b* | $\Delta b^*_{30}$ | $\Delta b^*_{60}$ |
| Example 1 | 200 | 80 | 30 | 20 | 96 | 37 | 22 | 3.3 | 0.5 | 1.2 |
| Example 2 | 200 | 80 | 30 | 20 | 70 | 81 | 38 | 3.4 | 0.9 | 2.1 |
| Example 3 | 120 | 70 | 30 | 20 | 80 | 48 | 30 | 3.3 | 0.8 | 1.9 |
| Example 4 | 180 | 110 | 30 | 20 | 90 | 45 | 29 | 3.3 | 0.6 | 1.4 |
| Example 5 | 420 | 160 | 30 | 20 | 80 | 108 | 48 | 3.5 | 1 | 2.3 |
| Example 6 | 80 | 20 | 30 | 20 | 80 | 40 | 20 | 3.3 | 0.6 | 1.5 |
| Example 7 | 200 | 80 | 30 | 110 | 96 | 37 | 109 | 3.4 | 0.7 | 1.5 |
| Example 8 | 200 | 80 | 25 | 25 | 96 | 32 | 27 | 3.3 | 0.4 | 1.1 |
| Comparative Example 1 | 170 | 20 | — | — | 0 | 170 | 20 | 3.5 | 3 | 9 |
| Comparative Example 2 | 250 | 320 | 30 | 20 | 40 | 162 | 200 | 3.5 | 2.8 | 8.5 |
| Comparative Example 3 | 290 | 30 | 30 | 20 | 60 | 134 | 24 | 3.5 | 1.5 | 4.1 |

4. The method according to claim 1 or 2, wherein said by-product phenol used as said phenol (b) contains an impurity component (β) which is an aromatic dihydroxy compound, and wherein the content of said impurity component (β) in said by-product phenol is 50 ppm by weight or less.

5. The method according to claim 3, wherein said by-product phenol used as said phenol (b) contains an impurity component (β) which is an aromatic dihydroxy compound, and wherein the content of said impurity component (β) in said by-product phenol is 50 ppm by weight or less.

6. The method according to claim 1 or 2, wherein said feedstock phenol mixture contains an impurity component (β) which is an aromatic dihydroxy compound, and wherein the content of said impurity component (β) in said feedstock phenol mixture is 90 ppm by weight or less.

7. The method according to claim 3, wherein said feedstock phenol mixture contains an impurity component (β) which is an aromatic dihydroxy compound, and wherein the content of said impurity component (β) in said feedstock phenol mixture is 90 ppm by weight or less.

8. The method according to claim 4, wherein said feedstock phenol mixture contains an impurity component (β) which is an aromatic dihydroxy compound, and wherein the content of said impurity component (β) in said feedstock phenol mixture is 90 ppm by weight or less.

9. The method according to claim 1 or 2, wherein said reactor is a multi-stage distillation column.

10. The method according to claim 3, wherein said reactor is a multi-stage distillation column.

11. The method according to claim 4, wherein said reactor is a multi-stage distillation column.

12. The method according to claim 6, wherein said reactor is a multi-stage distillation column.

* * * * *